United States Patent Office 3,403,471
Patented Oct. 1, 1968

3,403,471
METHOD OF CULTURING ALGAE IN AN ARTIFICIAL MEDIUM
Genevieve Clement, Coeuilly-Champigny, Michel Rebeller, L'Etang-la-Ville, and Claude Zarrouk, Villeneuve-la-Garenne, France, assignors to Institut Francais du Petrole, des Carburants et Lubrifiants, Rueil-Malmaison, France
No Drawing. Continuation-in-part of application Ser. No. 516,089, Dec. 23, 1965. This application Feb. 18, 1966, Ser. No. 528,404
Claims priority, application France, Feb. 18, 1965, 6,175; Sept. 29, 1965, 33,192
20 Claims. (Cl. 47—1.4)

ABSTRACT OF THE DISCLOSURE

Growing algae of the Oscillatoria family, particularly *Spirulina maxima*, having 63% protein in the dry state, employing an initial pH of about 7.5–12, preferably 8.5–11, and employing gaseous carbon dioxide to maintain the pH in said range.

---

This is a continuation-in-part of copending United States patent application Ser. No. 516,089, filed Dec. 23, 1965, now abandoned.

The present invention relates in general to the propagation of algae, and more particularly to a process of culturing algae in a synthetic aqueous medium.

The algae to which the process applies specifically are those which develop at a basic pH, for example 7.5–12, in the presence of carbonate or bicarbonate ions.

The species which develop in these conditions are well-known from the prior art, and it is thus of no use to give a detailed list of the same. If necessary a simple previous trial may be carried out to ascertain the ability of a given alga to develop in these conditions.

More specifically the present invention relates to the culture of algae belonging to the Oscillatoriaceae family, preferably of the species *Spirulina maxima*.

Some species of algae have heretofore been utilized in the production of food, proteins, fats, chlorophyll, lipides, vitamins and antibiotics. For example, algae of the species Chlorella in the dry state contain 50% protein, from which various products are obtained.

Moreover, irradiation of certain algae cultures liberates substantially pure oxygen. In this connection, the cultures of algae are especially useful for this purpose and are therefore desirable for use in an oxygen regeneration unit for example in submarines and space vehicles.

Since the astronauts consume oxygen and exhale carbon dioxide, it would be highly desirable to have a light on-board substance which supplies oxygen and absorbs carbon dioxide. The weight and bulk of the devices now used for this purpose would make their use prohibitive for journeys of long duration. However, passage of the exhaled air of the astronauts, which is polluted with carbonic gas, into intimate contact with an irradiated culture of algae produced according to this invention assures the regeneration of this air since the algae convert the $CO_2$ into substantially pure oxygen. Further, other waste products from the cosmonauts can also be readily converted by known biological means into $CO_2$ containing gases from which oxygen can be recovered.

The commercial methods of culturing algae are, however, rather expensive because of the elaborate apparatus required and high energy consumption. Thus, there is great interest in effectively and economically producing these algae by artificial culturing the same on an industrial scale.

To grow 1 kg. of chlorella on a dry basis with atmospheric air containing carbon dioxide as a source of carbon, large amounts of air on the order of 3,200 m.³ are required. (Thacker and Babcock, "The Journal of Solar Energy Science and Engineering," 1957, vol. 1, No. 1, page 44). Aeration with such large volumes of air requires rather expensive blowers, conduits and gas injectors, not to mention the energy required to operate the blowers.

In order to reduce the quantity of required gaseous nutrient and the associated apparatus therefor, it was proposed to use $CO_2$ in more concentrated forms for greater economy. However, previous experience has shown that it is not possible to effectively grow algae with gases containing high concentrations of $CO_2$. *Chlorella pyrenoidosa*, for example, exhibits maximum growth when the culture is aerated with air containing 0.1 to 5% by volume of $CO_2$. When the concentration was raised above 5%, a toxic effect due to the $CO_2$ is observed (Algal Culture From Laboratory to Pilot Plant, by J. Burlew, Carnegie Institution of Washington publication, 1961, page 41). The necessity, recognized by the art, of using $CO_2$ in low concentrations, confirms the undesirable necessity of using large volumes of gas to dilute the $CO_2$.

Another reason to operate with large volumes of gas such as air is derived from the necessity of stirring the suspension of algae of the Chlorella species, since otherwise the latter would sink to the bottom of the culture which would decrease their rate of growth.

However, although it is known that air artificially enriched with 0.1–5% by volume of $CO_2$ promotes maximal growth of Chlorellae algae, the use of said enriched air is in fact uneconomical since at the slightly acidic pH required by these algae, being about 5.7–6.5, according to Henry's law, $CO_2$ dissolved in the culture medium is in equilibrium with the gaseous phase over said medium. It is thus clear that:

If the culture is developed in open air, considerable losses of $CO_2$ occur; it is thus necessary to operate in closed media, for example tunnels, which increases considerably the investment cost;

$CO_2$ must be injected continuously since the maximum amount of dissolved $CO_2$ is low and any interruption of injection would decrease quickly the growth of the algae;

The photosynthesis reaction consuming $CO_2$ to make carbohydrates, the rate of reaction is limited by the low concentration of $CO_2$ in the aqueous culture medium, according to the following scheme:

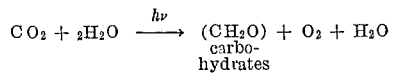

$$CO_2 + 2H_2O \xrightarrow{h\nu} (CH_2O) + O_2 + H_2O$$
$$\text{carbo-}$$
$$\text{hydrates}$$

and as pointed out above, concentrations of $CO_2$ higher than 5% are toxic to the algae.

It is therefore a principal object of the invention to provide a process of artificially culturing a species of algae having a higher nutritive value than Chlorella, since *Spirulina maxima* contains in the dry state 63% proteins.

Another object is to provide a process of culturing algae in open air with use of $CO_2$ as a source of carbon without loss of the same.

Another object is to provide such a process wherein no costly investment is required.

Another object is to provide such a process wherein $CO_2$ may be injected continuously or intermittently at will.

Another object is to provide such a process wherein algae are grown with a nutrient gas containing a large concentration of carbon dioxide, for example pure $CO_2$ or combustion gases.

Another object is to provide a culture of algae which necessitates no admission of air and no stirring.

It is another object of the invention to provide an improved process of artificially culturing algae of the Oscillatoria family, especially the species *Spirulina maxima*.

It is still another object of the invention to provide an improved process of producing edible algae in a synthetic aqueous medium.

Other objects and advantages of the present invention will become apparent by reference to the following description and claims appended hereto.

It has been discovered in culturing algae of the Oscillatoria family, especially the Spirulina species, that when the algae are seeded in an illuminated culture medium at a pH between 7.5 and 12, preferably between 8.5 and 11, these algae can be effectively grown at a high rate by contacting the medium with a gas containing carbon dioxide at any concentration. Under these culture conditions, no intoxication of the algae occurs even with a gas containing more than 6% by volume, more preferably 10 to 100% by volume, of carbon dioxide, and a general increase in the growth of the culture is even observed when these high concentrations are used.

It is thus clear that the concentration of $CO_2$ in the gas contacted with the medium, preferably by bubbling, will range for example from the concentration in air, being about 0.03% by volume, up to 100%.

Growth of algae by the method of the present invention is particularly advantageous because it permits:

(1) The use of concentrated carbonic gas as the gaseous feed which reduces the volume of the injected gas. In this event, smaller gas blowers and motors therefor can be used. Since aeration of the culture is unnecessary, $CO_2$ is the only gas injected into the culture of which about 1 m.$^3$ will suffice to produce 1 kg. dry algae; or alternatively, (2) A less expensive gas can be used such as for example, waste industrial gases produced from the combustion of carbonaceous materials which generally contain from about 11 to 14% carbon dioxide. Even in this case, the volume of gas circulated is less than heretofore required, and the usual apparatus required to dilute the gas is no longer needed.

(3) A continuous or intermittent injection of $CO_2$ containing gas, at will, the only condition being that injection be practised when the pH tends to exceed 12, preferably when it tends to exceed 11, to bring back its value into the above defined range.

The unexpected results obtained according to this invention cannot be explained in a quite satisfactory manner. It is thought however that $CO_2$ is not used in the same way as in known cultures in acidic medium. There would be here no direct use of carbon dioxide, since the latter would be transformed to carbonate and/or bicarbonate ions and would be used as such by the algae. $CO_2$ would just act to replenish the medium with carbonate and bicarbonate ions. The reaction scheme would be the following.

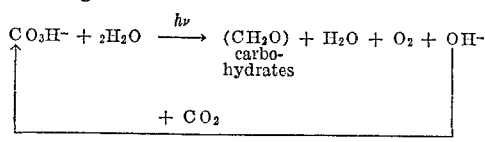

The excellent results attained using nutrient gases containing high concentrations of carbon dioxide are dependent upon controlling the hydrogen ion concentration within the specified pH range. In fact the algae will not develop satisfactorily if the pH is either below or above this range.

Therefore, it is advantageous to initially bring the culture medium to the specified pH values. In the absence of carbonates or bicarbonates, the pH of the medium can be adjusted by adding thereto a weak acid salt such as, for example a borate of sodium or potassium, or otherwise any compatible base, for example sodium or potassium hydroxide.

Except for the above conditions of pH and $CO_2$ admission, conventional culture media for algae may be used.

The culture medium to be used in the process of this invention is preferably composed of the following:

(1) Water.

(2) Mineral salts capable of producing the necessary ions, for example in the proportions shown in Table I.

TABLE I

| Ions | General proportions (grams/litre) | Preferred proportions (grams/litre) |
|---|---|---|
| Na | 0.1–20 | 1–11 |
| K | 0.1–10 | 0.4–1 |
| Fe | >0.0001 | >0.001 |
| Mg | >0.0001 | >0.001 |
| Ca | >0.0001 | >0.001 |
| $SO_4$ | >0.0001 | >0.001 |
| $PO_4$ | 0.05–10 | 0.5–3 |

Other ions which can be used in the culture medium are Cl, $BO_3$, Mn, Zn, Cu, Mo, V, Cr, Ni, Co, W and/or Ti.

(3) A source of assimilable nitrogen, for example, in the form of nitrates, which furnishes preferably the equivalent of about 0.1 to 10 g./l. of nitrogen.

(4) A source of assimilable carbon consisting necessarily of carbon dioxide and optionally of carbonates and/or bicarbonates.

If the process of this invention is performed in the presence of carbonates and/or bicarbonates, the total concentration of $CO_3$ or $HCO_3$ ions in the culture medium can advantageously range from 0.5 to 25 g./l. without any deleterious effects. The total concentration of dissolved salts can advantageously be maintained above 3 g./l. and preferably between 5 and 35 g./l.

According to a preferred embodiment of this invention, a metal ion complexing agent is added to the culture. Suitable complexing agents include, for example, ethylenediamino-tetracetic acid, preferably in the form of its disodium salt, nitroso R salt, citric acid, nitrilotriacetic acid or γ-acetaminotropolone.

As examples of useful algae, the following may be mentioned:

*Spirulina maxima*, *Oscillatoria* and *Phormidium*, belonging to the Oscillatoriaceae family, order Nostocales, division Cyanophyta (Blue-Green Algae).

*Anabaena*, *Nostoc* and *Cylindrospermum*, belonging to the Nostocaceae family, same order, same division.

However *Spirulina maxima* gives the highest yields and is thus preferred.

This preferred alga may be described as follows: Blue-green pluricellular alga, of helicoidal shape. Its morphology is variable; when it has 7 turns, its length is about 230–300 microns and the thickness of one turn is about 10 microns. It exhibits natural motility and displaces itself in water with a screw movement.

This alga has been described by L. Geitler, Handbuch der Pflanzenanatomie, edited by K. Lindsbauer, Berlin (1936), and was found in waters from Oakland (California).

Other names for this algae are *Spirulina platensis*, *Arthrospira platensis*, or *Arthrospira maxima*.

According to an especially advantageous embodiment of the present process, the culture medium is obtained from naturally occurring saline water such as ocean water and the saline waters from geological strata. It is only preferred that the salinity of the waters be below 50 g./l. of salts. When these waters are exposed to solar radiation, they can be used alone without the use of additional mineral salts. Surprisingly, it has been found that the high sodium chloride content of these saline waters is non-toxic to Oscillatoriaceae. When ocean water is to be used as the culture medium, the materials shown in Table II are preferably added thereto:

TABLE II $NO_3^-$ for example in the form of $KNO_3$:0.1 to 10 g./l.; $PO_4^{---}$ for example in the form of $K_2HPO_4$ or in the form of insoluble calcium phosphate: 0.01² to 1 g./l.; trace elements such as iron Complexing agent, for example ethylene-diamino-tetracetic acid as its disodium salt.

When mineral waters are selected as the culture medium, their mineral salt content should be adjusted to correspond to the mineral salt levels shown in Table II above. In this connection, it may be necessary to treat waters that are too strongly calcareous, for example, with sodium carbonate to precipitate the excess of calcium therefrom, e.g. as $CaCO_3$. In other cases, it may be desirable to raise the concentration of minerals in naturally occurring saline waters by evaporating a portion of the water.

To obtain optimum and economical algae growth, the preferred culture conditions comprise a temperature of the order of 20 to 50° C., preferably 25 to 38° C., and a strong irradiation source emitting at least 2,000 lumens, and preferably above 100,000 lumens, applied either intermittently or continuously. The suspension of algae can be circulated continuously between a slightly elevated temperature zone, for example below 35° C., and a higher temperature zone which can reach 40 to 50° C., this latter zone receiving an especially intense irradiation. The algae suspension can also be circulated between a first zone which may or may not be irradiated but which is supplied with $CO_2$, and an irradiated second zone that is not supplied with nutrient gas, but in which very pure oxygen is collected.

The production of algae can be carried out on a practically continuous basis by the periodic removal, for example daily, of a certain proportion of the algae, to maintain the algae concentration in the culture substantially constant. The algae obtained by these methods are separated by any suitable means, e.g. by centrifuging, filtration or decantation. The substances in the culture medium most rapidly consumed are the nitrates, the phosphates and the MG, Ca and Fe ions. The consumption of nitrate is especially important since the nitrogen content of dry spirulines is about 10%. By periodically replenishing the substances in the medium that are consumed by the algae, the cultures can be effectively maintained for several months or more.

In the following examples the trace element solution added to the culture medium is of the composition shown in Table III.

TABLE III

| | |
|---|---|
| $FeSO_4$ | 0.004 |
| $MgSO_4$ | 0.020 |
| $MnCl_2$ | 1.81 |
| $CuSO_4$ | 0.079 |
| $VO_3NH_4$ | 0.02296 |
| $NiSO_4$ | 0.04785 |
| $WO_4Na_2$ | 0.01791 |
| $CaCl_2$ | 0.020 |
| $H_3BO_3$ | 2.86 |
| $ZnSO_4$ | 0.22 |
| $MoO_3$ | 0.01506 |
| $Cr_2K_2(SO_4)_4$ | 0.09601 |
| $Co(NO_3)_2$ | 0.04938 |
| $Ti_2(SO_4)_3$ | 0.040 |

Additional water to make up 1 liter.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Culture medium.—For each aqueous liter there are included:

| | G. |
|---|---|
| $NaHCO_3$ | 12 |
| $K_2HPO_4$ | 0.5 |
| $FeSO_4$ | 0.01 |
| $KNO_3$ | 3 |
| $MgSO_4$ | 0.5 |
| $CaCl_2$ | 0.02 |
| Disodium salt of ethylenediaminetetracetic acid | 0.07 |

Two cc. of the previously described trace element solution containing especially the ions Mn, Cu, $NH_4$, Ni, Zn, Cr, Co, Ti, Mo, $VO_3$, $WO_4$, $BO_3$; and the rest water.

A volume of 1,350 liters of the culture medium having an initial pH of 8.5 is introduced into a container having a surface exposure of 15 m.².

To this solution 0.2 g./l. of algae (weight given as dry algae) of the species *Spirulina maxima* were added.

The algae cultured in the open air, are permitted to grow in the culture solution until the concentration of fresh algae corresponds to 3.1 g. of dry algae per liter. The algae are then collected at a rate sufficient to maintain a constant concentration thereof in the culture medium.

At the beginning of the process, the pH of the culture medium is permitted to increase naturally to 9.8, whereupon substantially pure $CO_2$ from a bottle containing the same in compressed form is bubbled through the culture medium in either a continuous or intermittent manner to maintain the pH between 9 and 10. The $CO_2$ is injected into the culture medium through a distributor plate of stainless steel 8 cm. in diameter. The medium was also mechanically agitated with a bladed mixer rotating at a speed of 3 revolutions per minute.

On the basis of a total culturing time of 15 days, the yield of dry algae was 14.2 g./m.²/day.

Temperature.—During this test the temperature of the culture medium varied from an average minimum of 23° C. to an average maximum of 32° C.

Irradiation.—The test was carried out in July in the south of France with natural solar irradiation. The maximal irradiation at noon was about 120,000 lumens.

EXAMPLE 2

The operating conditions used were the same as in Example 1 with the exception of the pH which was maintained between 9 and 9.5. The pH was controlled in this test by discontinuously passing through the culture medium air containing $CO_2$ in a concentration of 11% by volume which is its usual concentration in smoke.

In this run, 0.2 g./l. of *Spirulina maxima* (dry weight) were initially introduced into the culture medium. The irradiation was substantially same as in Example 1.

During a warm period (average minimum night temperature: 23° C. and average maximum day temperature: 34° C.) the yield of dry algae was 16.4 g./m.²/day. During colder periods (average minimum night temperature: 21° C. and average maximum day temperature: 30° C.) the yield of dry algae was 10.2 g./m.²/day. During the entire culturing time, a concentration of algae equivalent to 2 g. dry algae per liter was maintained.

Since some of the mineral salts are consumed during the culturing process, it was necessary to replenish them from time to time to maintain the concentration thereof at a relatively constant level.

The total culturing time was 48 days and the total weight of algae collected was 4,100 g.

EXAMPLE 3

This example relates to the culturing of *Spirulina maxima* in a laboratory vessel having a circular area of 0.785 m.² and a depth of 6 cm.

To 45 liters of the culturing medium of Example 1, 9 g. of *Spirulina maxima* were added. A gas resulting from the combustion of propane containing 9% by volume of $CO_2$ was then bubbled through the culture medium to maintain the pH of the medium in the range of 8.8 to 9.0 The medium was irradiated 8 hours a day with from 20,000 to 40,000 lumens while mechanically agitating the same. On the basis of a 20 day run, the yield of dry algae was 5.95 g./day or 7.6 g./m.$^2$/day.

EXAMPLE 4

To 1 liter of ocean water are added:

| | | |
|---|---|---|
| $KNO_3$ | g-- | 3 |
| $Ca_3(PO_4)_2$ | g-- | 1 |
| $FeSO_4$ | g-- | 0.008 |
| Disodium salt of ethylene-diamino-tetracetic acid | g-- | 0.064 |
| Trace element solution | cc-- | 1 |

The pH of the resulting solution is adjusted to 8.1 by the addition of sodium carbonate thereto.

600 cc. of the culture medium thus obtained are inoculated with algae of the type *Spirulina maxima* and the algae culture is irradiated 12 hours with 8,000 lumens, stored in the dark 12 hours, and so on, while maintaining the temperature at about 27° C.

Carbon dioxide is bubbled therethrough in sufficient amounts to maintain the pH between 8.1 and 8.5.

The development of the culture is normal.

EXAMPLE 5

In this run mineral water was used having the following composition:

| | G./l. |
|---|---|
| Ca | 0.12 |
| Na | 0.26 |
| Mg | 0.06 |
| K | 0.04 |

5 g./l. of $Na_2CO_3$ are dissolved in this solution and the precipitated $CaCO_3$ is removed therefrom. $CO_2$ is then bubbled through the resulting solution to convert the remaining sodium carbonate into sodium bicarbonate.

To this solution are added 3 g./l. $KNO_3$, 0.5 g./l. $K_2HPO_4$, 0.5 g./l. $MgSO_4$, 0.02 g./l. $CaCl_2$, 0.008 g./l. $FeSO_4$, 0.064 g./l. of the disodium salt of ethylene diamino tetracetic acid, and 1 cc./l. of the trace elements solution of Table III. The mixture is then stirred until the solution is homogeneous.

15 liters of the resulting solution are inoculated with 3 g. of spirulines (dry weight).

The pH of the culture medium is maintained between 8.1–8.5 during which it is irradiated with between 20,000 and 50,000 lumens while air containing 20% $CO_2$ by volume and at a temperature of 33° C. is bubbled therethrough to maintain said pH.

During a total run of 30 days, the yield of dry algae averaged 15 g./m.$^2$/day.

EXAMPLE 6

A culture medium having the following composition in grams per liter of solution is used:

| | |
|---|---|
| $NaHCO_3$ | 8.4 |
| $K_2HPO_4$ | 0.5 |
| $KNO_3$ | 3 |
| NaCl | 1 |
| $Na_2SO_4$ | 1 |
| $MgSO_4$ | 0.2 |
| $FeSO_4$ | 0.01 |
| $CaCl_2$ | 0.04 |
| Disodium salt of ethylene diamino tetracetic acid | 0.08 |

2 cc. of the trace element solution of Table III.
Water, sufficient to make up 1 liter.

200 cc. of this medium is inoculated with algae of the type *Spirulina maxima* and the solution maintained at the temperature of 30° C. The culture is contacted with air containing 12% $CO_2$ and irradiated by two lamps, each delivering 130,000 lumens. The pH of the culture medium is kept at 8.3 by regulating the admission of $CO_2$ containing air.

56.2 cc./hour of oxygen under standard temperature and pressure are produced from the culture having an algae content corresponding to 168 mg. on a dry basis. Thus, the volume of oxygen liberated per gram of dry algae is 334 cc./hour.

Therefore, 17 liters of a culture of spirulines containing 3.5 g./l. of algae (weight of the dry algae) would be sufficient to provide one person with the necessary oxygen. With a similar culture containing 0.168 g./l. of dry algae, the volume of the culture would be 355 liters.

Under the same temperature and irradiation conditions as those described above, a culture of *Chlorella pyrenoidosa* furnishes only 280 cc. oxygen per hour per gram of dried algae.

The preceding examples can be repeated with similar success by substituting the generically and specifically described reactants and operating conditions of this invention for those used in the preceding examples.

EXAMPLE 7

14 liters of the culture medium of Example 1 at 30° C. were seeded with 0.2 g./l. of *Spirulina maxima* (weight given in the dry state) and irradiated by means of electric bulbs of 300 watts each on a useful surface of 0.17 m.$^2$. The irradiation was from 20,000 to 30,000 lumens.

Air containing 2% by volume of $CO_2$ was bubbled therethrough at a rate of 100 liters per hour. The pH remained between 8.5 and 9.

The yield of algae (expressed as dry weight) was 16 g./m.$^2$/day.

From the foregoing description, one skilled in the art can easily ascertain the essential characteristics of this invention, and wthout departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process of culturing algae of the species *Spirulina maxima* in an irradiated synthetic aqueous medium having an initial pH comprised between about 8.5–11, comprising contacting said medium with a gas containing carbon dioxide to maintain the pH in the above range.

2. The process of claim 1 wherein said gas contains from 0.03 to 100% by volume of carbon dioxide.

3. The process of claim 1 wherein said gas contains from 6 to 100% by volume of carbon dioxide.

4. The process of claim 1, wherein said gas contains 10–100% by volume of carbon dioxide.

5. The process of claim 1, wherein said gas includes the products of combustion of carbonaceous materials.

6. The process of claim 1, wherein the gas is substantially pure carbon dioxide.

7. The process of claim 1 further characterized in that the culture medium contains 0.5 to 25 g./l. of an additional carbon source selected from the group consisting of $CO_3$ ions and $HCO_3$ ions.

8. The process of claim 1 wherein dissolved salts in the culture medium are in a concentration between 5 and 35 g./liter.

9. The process of claim 1 wherein the culture medium is prepared from naturally occurring mineral waters.

10. The process of claim 1 wherein the culture medium is prepared from ocean water.

11. The process of claim 1 wherein the temperature of the culture medium is maintained at 20–50° C.

12. The process of claim 11 wherein the culture medium is irradiated with a source emitting at least 2,000 lumens.

13. The process of claim 1 wherein the temperature of the culture medium is maintained at 25–38° C.

14. The process of claim 13, wherein said gas contains 10–100% by volume of carbon dioxide.

15. The process of claim 13 wherein the culture medium is irradiated with a source emitting at least 100,000 lumens.

16. A process as defined by claim 13 wherein said synthetic aqueous medium contains nitrate ions as the sole source of nitrogen.

17. The process of claim 16, said gas contains 10–100% by volume of carbon dioxide.

18. The process of claim 1 further characterized in that the culture medium is circulated between a first zone wherein the $CO_2$ containing gas is admitted and a second irradiated zone wherefrom substantially pure oxygen is collected.

19. The process of claim 1 wherein the algae are grown in a continuous process, the steps comprising: removing produced algae from the culture media at a rate sufficient to maintain a constant concentration thereof in said media, and periodically replenishing the culture media with the nutrients consumed by the algae.

20. A process as defined by claim 1 wherein said synthetic aqueous medium contains nitrate ions as the sole source of nitrogen.

References Cited

UNITED STATES PATENTS

| | | | |
|---|---|---|---|
| 2,658,310 | 11/1953 | Cook | 47—1.4 |
| 2,815,607 | 12/1957 | Schroeder | 47—1.4 |
| 3,218,758 | 11/1965 | Konikoff | 47—1.4 |
| 3,224,143 | 12/1965 | Tew et al. | 47—1.4 |

OTHER REFERENCES

Algal Culture From Laboratory to Pilot Plant, Burlew, Carnegie Inst. of Wash., Publ. 600, 1953, pages 32, 177–78 relied on.

ROBERT E. BAGWILL, *Primary Examiner.*